(12) United States Patent
Huang et al.

(10) Patent No.: US 10,741,953 B1
(45) Date of Patent: Aug. 11, 2020

(54) TRANSCEIVER COOLING

(71) Applicant: Dell Products L.P., Round Rock, TX (US)

(72) Inventors: Alex Huang, Pflugerville, TX (US); Juan M. Gonzalez, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/582,852

(22) Filed: Sep. 25, 2019

(51) Int. Cl.
*H01R 13/00* (2006.01)
*G02B 6/42* (2006.01)
*H01R 13/502* (2006.01)

(52) U.S. Cl.
CPC ......... *H01R 13/005* (2013.01); *G02B 6/4261* (2013.01); *G02B 6/4269* (2013.01); *H01R 13/502* (2013.01)

(58) Field of Classification Search
CPC .......................... H01R 13/005; G02B 6/4269
See application file for complete search history.

(56) References Cited

U.S. PATENT DOCUMENTS

| 8,035,973 | B2 | 10/2011 | McColloch | |
|---|---|---|---|---|
| 9,453,972 | B1 | 9/2016 | Arvelo et al. | |
| 10,073,231 | B1* | 9/2018 | Yang | H01L 23/00 |
| 2010/0067196 | A1 | 3/2010 | Costello et al. | |
| 2016/0093996 | A1* | 3/2016 | Phillips | H01R 24/60 |
| | | | | 439/487 |
| 2016/0202434 | A1* | 7/2016 | Masahiko | G02B 6/4292 |
| | | | | 385/14 |
| 2018/0049348 | A1* | 2/2018 | Bucher | G02B 6/4271 |
| 2018/0090863 | A1* | 3/2018 | Yang | H01R 13/502 |
| 2018/0226735 | A1* | 8/2018 | Leigh | H01R 12/7005 |
| 2019/0116692 | A1* | 4/2019 | Little | H05K 7/20418 |
| 2020/0077541 | A1* | 3/2020 | Sharf | H05K 5/0286 |

* cited by examiner

*Primary Examiner* — James Harvey
(74) *Attorney, Agent, or Firm* — Jackson Walker L.L.P.

(57) ABSTRACT

An apparatus may include an actuator, a heat-rejecting medium, and a receptacle for receiving a pluggable module. The pluggable module may be operable to be inserted into the receptacle in a first direction. The actuator may be operable to be translated in the first direction by the insertion of the pluggable module into the receptacle. The heat-rejecting medium may be operable to be translated in a second, different direction by the actuator when the actuator is translated in the first direction. The translation of the heat-rejecting medium in the second direction may be operable to cause the heat-rejecting medium to become thermally coupled to the pluggable module when the pluggable module is inserted into the receptacle.

20 Claims, 7 Drawing Sheets

TRANSCEIVER COOLING

TECHNICAL FIELD

The present disclosure relates in general to information handling systems, and more particularly to providing heat-rejecting media for cooling a pluggable module such as a transceiver.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may have a network interface or other input/output (I/O) interface configured to receive an optical transceiver module (e.g., a small form-factor pluggable (SFP) transceiver or a quad small form-factor pluggable (QSFP) transceiver of any I/O speed). Such transceiver modules often plug into "cages" disposed on an I/O interface card, which often reside in the rear of the information handling system in which hot air (e.g., at 55° C. to 65° C.) is exhausting from the system. Such temperatures are often near the upper limit of temperature requirements of optical transceiver modules.

In an attempt to reduce temperatures within optical transceiver modules, heatsinks have been implemented in fixed locations on cages disposed on I/O interface cards and configured to receive the optical transceiver modules. However, because such transceivers are removable, existing approaches have limitations. For example, inserting and removing a transceiver may tend to displace and remove any thermal interface material that has been applied between the transceiver and a heatsink, reducing the effectiveness of the heatsink.

Further, a transceiver resides in a connector cage which may act as an air shield that prevents effective cooling of the transceiver. The gap between the cage and the transceiver adds extra thermal resistance for heat removal.

Accordingly, there is a need for an improved way of coupling a heatsink (or other type of heat-rejecting media) to a transceiver. Effectively removing heat from a transceiver may reduce thermal design complexity and lower the power consumption of fans or other components of the cooling system.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with cooling pluggable modules such as transceivers.

In accordance with embodiments of the present disclosure, an apparatus may include an actuator, a heat-rejecting medium, and a receptacle for receiving a pluggable module. The pluggable module may be operable to be inserted into the receptacle in a first direction. The actuator may be operable to be translated in the first direction by the insertion of the pluggable module into the receptacle. The heat-rejecting medium may be operable to be translated in a second, different direction by the actuator when the actuator is translated in the first direction. The translation of the heat-rejecting medium in the second direction may be operable to cause the heat-rejecting medium to become thermally coupled to the pluggable module when the pluggable module is inserted into the receptacle.

In accordance with these and other embodiments of the present disclosure, a method may include: coupling an actuator and a heat-rejecting medium to a receptacle that is operable to receive a pluggable module, wherein the pluggable module is operable to be inserted into the receptacle in a first direction. The actuator may be coupled to the receptacle such that the actuator is operable to be translated in the first direction by the insertion of the pluggable module into the receptacle. The heat-rejecting medium may be coupled to the receptacle such that the heat-rejecting medium is operable to be translated in a second, different direction by the actuator when the actuator is translated in the first direction. The translation of the heat-rejecting medium in the second direction may be operable to cause the heat-rejecting medium to become thermally coupled to the pluggable module when the pluggable module is inserted into the receptacle.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
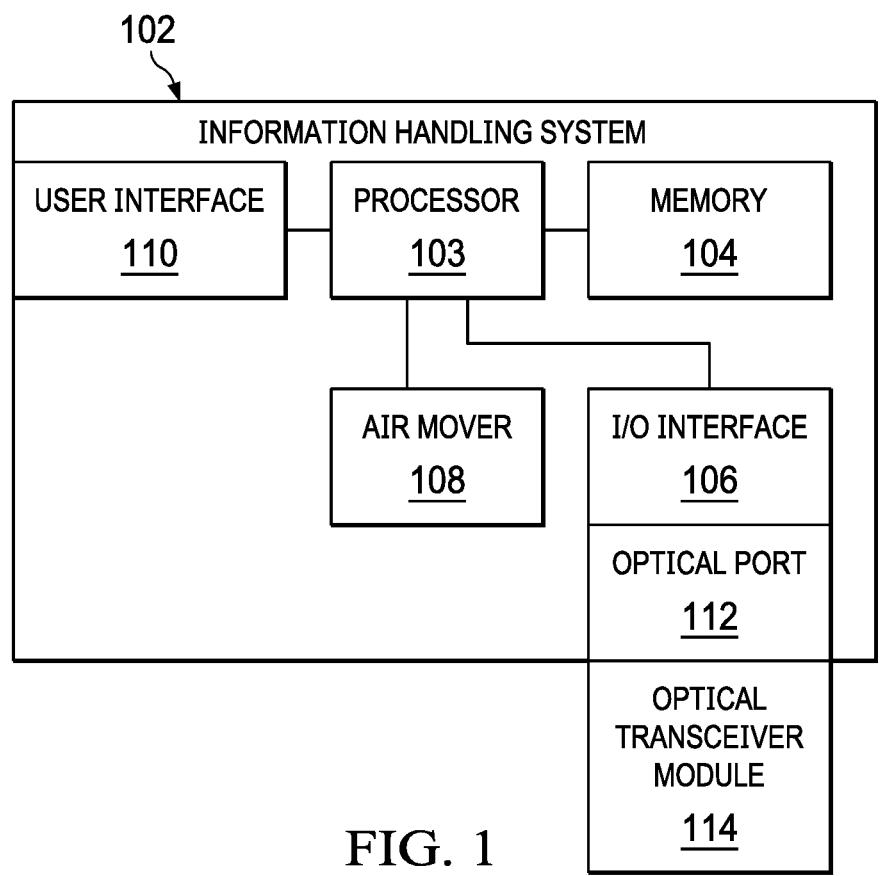
FIG. 1 illustrates a block diagram of an example information handling system, in accordance with embodiments of the present disclosure.

Preferred embodiments and their advantages are best understood by reference to FIGS. 1 through 3E, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "circuit board" may broadly refer to printed circuit boards (PCBs), printed wiring boards (PWBs), printed wiring assemblies (PWAs), etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

For the purposes of this disclosure, the term "heat-rejecting media" may broadly refer to any device that is operable to transfer heat away from a component. Typically, the component may be an active component that generates heat (e.g., through the use of electrical power). Examples of heat-rejecting media include heatsinks, heat pipes, radiators, heat spreaders, and the like.

FIG. 1 illustrates a block diagram of selected components of an example information handling system 102, in accordance with embodiments of the present disclosure. In some embodiments, information handling system 102 may be a personal computer (e.g., a desktop computer or a portable computer). In other embodiments, information handling system 102 may comprise a storage server for archiving data.

As depicted in FIG. 1, information handling system 102 may include a processor 103, a memory 104 communicatively coupled to processor 103, an input/output interface 106 communicatively coupled to processor 103, an air mover 108 communicatively coupled to processor 103, a user interface 110 communicatively coupled to processor 103, and an optical port 112 communicatively coupled to I/O interface 106.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

I/O interface 106 may comprise any suitable system, apparatus, or device operable to serve as an interface between information handling system 102 and one or more other external devices. For example, in some embodiments, I/O interface 106 may comprise a network interface configured to serve as an interface between information handling system 102 and information handling systems via a network, in which case I/O interface 106 may comprise a network interface card, or "NIC."

Air mover 108 may include any mechanical or electro-mechanical system, apparatus, or device operable to move air and/or other gases in order to cool information handling resources of information handling system 102. In some embodiments, air mover 108 may comprise a fan (e.g., a rotating arrangement of vanes or blades which act on the air). In other embodiments, air mover 108 may comprise a blower (e.g., a centrifugal fan that employs rotating impellers to accelerate air received at its intake and change the direction of the airflow). In these and other embodiments, rotating and other moving components of system air mover 108 may be driven by a motor. In operation, air mover 108 may cool information handling resources of information handling system 102 by drawing cool air from the outside of and into an enclosure (e.g., chassis) housing the information handling resources, expel warm air from inside the enclosure to the outside of such enclosure, and/or move air across one or more heat-rejecting media (not explicitly shown) internal to or external to the enclosure to cool one or more information handling resources.

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device.

Optical port 112 may comprise a connector in the form of any suitable combination of a jack, a socket, and/or a "cage" for receiving a corresponding connector of an optical transceiver module 114.

Optical transceiver module 114 may include any system, device, or apparatus that houses and includes an optical transceiver configured to convert an incoming optical signal into an equivalent electrical signal, and communicate such equivalent electrical signal to I/O interface 106, and also configured to receive an electrical signal from I/O interface 106, convert such electrical signal into an equivalent optical signal, and communicate such optical signal as an outgoing optical signal (e.g., via an optical cable, which may be integral to the same assembly as optical transceiver module 114). Optical transceiver module 114 may include an SFP transceiver, a QSFP transceiver, or any other suitable form factor. Optical transceiver module 114 may include one or more active devices that consume electrical power and produce waste heat.

In addition to processor 103, memory 104, I/O interface 106, air mover 108, user interface 110, optical port 112, and optical transceiver module 114, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electromechanical device (e.g., fan), display, power supply, and/or any portion thereof. An information handling resource may comprise any suitable package or form factor, including without limitation an integrated circuit package or a printed circuit board having mounted thereon one or more integrated circuits.

As discussed above, embodiments of this disclosure may provide improved cooling for optical transceiver module 114. For example, some embodiments include a heat-rejecting medium that is pressed onto the surface of optical transceiver module 114 with spring force when optical transceiver module 114 is inserted.

When optical transceiver module 114 is removed, the heat-rejecting medium may become detached from optical transceiver module 114 and travel some distance away from optical transceiver module 114. Further, because of the mechanisms employed, some embodiments may be able to use thermal interface material (e.g., disposed on the bottom of the heat-rejecting medium) without having such thermal interface material scraped away as optical transceiver module 114 is inserted or removed.

In some embodiments, these movements of the heat-rejecting medium may occur "automatically," e.g., without the requirement that a user undertake any additional interaction with the system.

Figure 2A:
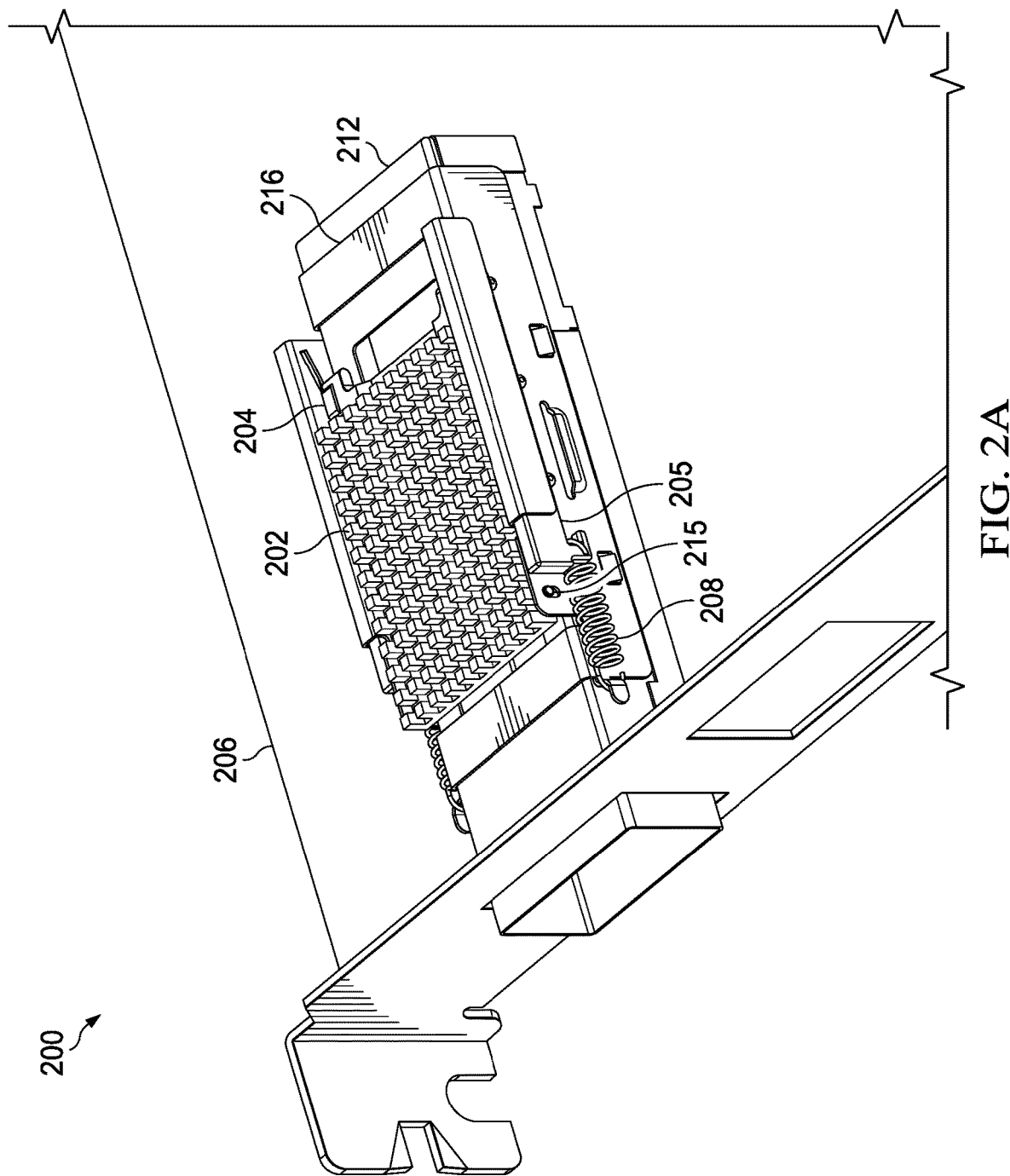
FIGS. 2A and 2B illustrate perspective views of an example optical transceiver module, in accordance with embodiments of the present disclosure.
Figure 2B:
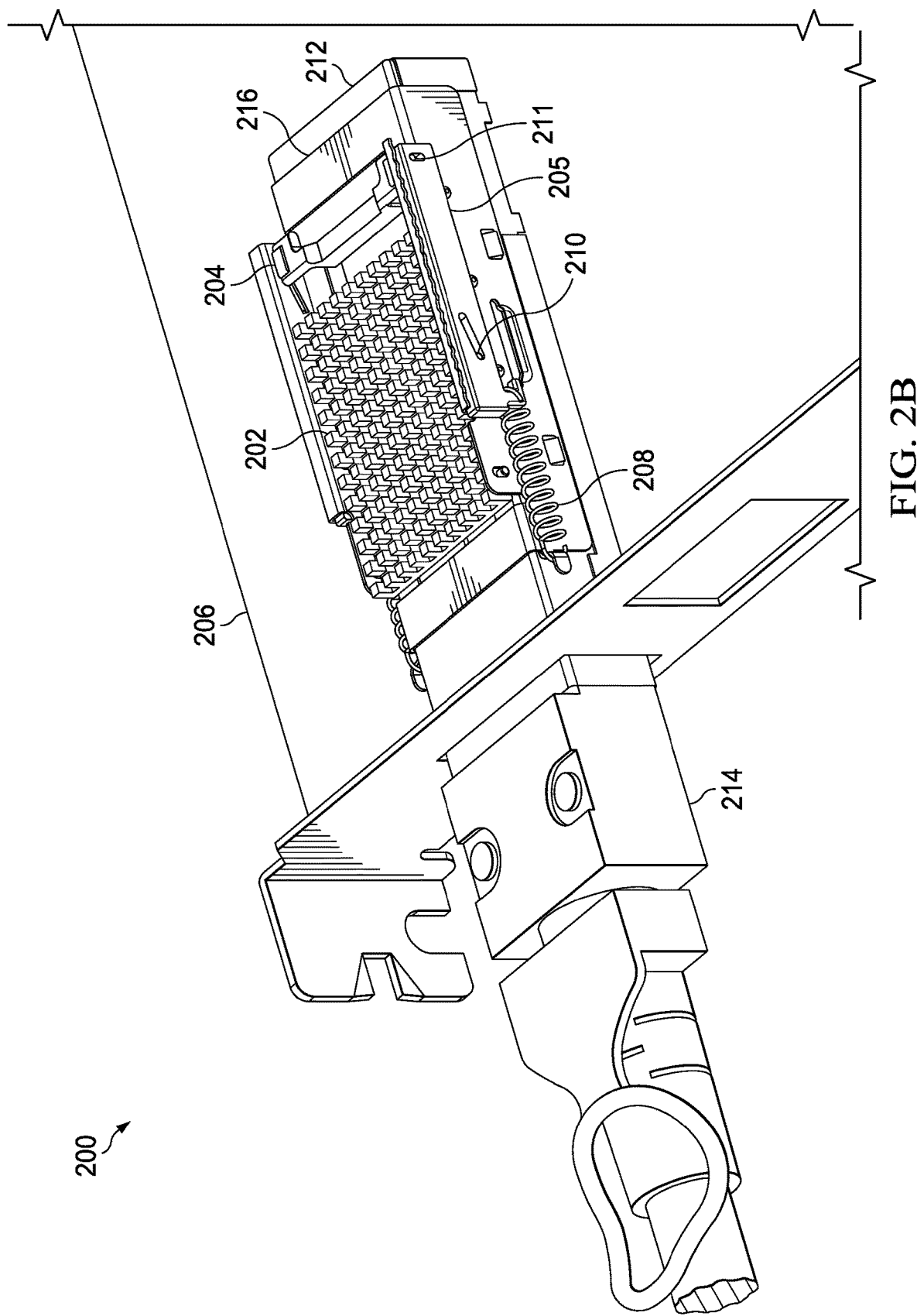

FIG. 2 (which includes FIG. 2A and FIG. 2B) illustrates a perspective view of an example system 200 in which I/O interface 206 includes optical port 212, into which optical transceiver module 214 is inserted. In some embodiments, example optical transceiver module 214 depicted in FIG. 2 may be used to implement optical transceiver module 114 of FIG. 1.

In particular, FIG. 2A shows system 200 before optical transceiver module 214 is inserted. FIG. 2B shows system 200 after optical transceiver module 214 is inserted. Further, many of the features in FIG. 2 are symmetrical, appearing on both sides of the embodiment. Because of the perspective in FIG. 2 and other FIGURES, however, sometimes only one of such features is explicitly shown.

As shown in FIG. 2, optical port 212 may include a heat-rejecting medium 202 (shown as a heatsink in this example). Optical port 212 may comprise a metal enclosure configured to house and/or provide mechanical structure for optical transceiver module 214, including mechanical features (e.g., guiding features) for aligning and/or mechanically securing optical transceiver module 214 to I/O interface 206 via optical port 212. Optical port 212 may include a fixed portion 216, which may include a mechanical linkage 215 coupled to heat-rejecting medium 202. As shown, mechanical linkage 215 may constrain the movement of heat-rejecting medium 202 such that heat-rejecting medium 202 is able to move only up or down.

Optical port 212 may also include one or more actuators (e.g., actuator 204 and actuator 205) which are operable to cause heat-rejecting medium 202 to move downward through an aperture of fixed portion 216 as optical transceiver module 214 is inserted. In some embodiments, multiple actuators 205 may be present (e.g., one on each side of optical port 212). Further, actuator 205 is partially obscured by a cover in FIG. 2A, which is removed in FIG. 2B for the sake of clarity.

Springs 208 (only one of which is shown from the depicted angle) may provide tension to bias the assembly into its desired configuration when optical transceiver module 214 is not inserted. For example, when optical transceiver module 214 is removed, springs 208 may cause heat-rejecting medium 202 to be retracted. In some embodiments, additional springs may provide spring force to press heat-rejecting medium 202 against optical transceiver module 214 when it is inserted.

As optical transceiver module 214 is inserted, actuator 205 moves in a first direction (e.g., the same direction as the motion of optical transceiver module 214, which is to the right in this view). A mechanical linkage 210 between actuator 205 and heat-rejecting medium 202 causes heat-rejecting medium 202 to move in a second direction (downward in this view). In some embodiments, mechanical linkages in this disclosure may be implemented via a pin of one component interfacing with a hole or an elongated slot in another component.

In some embodiments, optical transceiver module 214 may press directly against actuator 205 (or some component thereof) to cause this motion of actuator 205. In other embodiments (e.g., as shown in FIG. 2) actuator 204 may be present and may act as an "intermediary" actuator between optical transceiver module 214 and actuator 205. For example, as shown in FIG. 2, actuator 204 may move along an angled path (upward and to the right in this view) as optical transceiver module 214 is inserted. Mechanical linkage 211 between actuator 204 and actuator 205 may cause actuator 205 to move to the right, and mechanical linkage 210 between actuator 205 and heat-rejecting medium 202 may cause heat-rejecting medium 202 to move downward and come into contact with optical transceiver module 214.

FIG. 3 (which includes FIGS. 3A-3E) illustrates a side view of an example system 300 (generally similar to system 200) in which an optical port receives optical transceiver module 314. In some embodiments, example optical transceiver module 314 depicted in FIG. 3 may be used to implement optical transceiver module 114 of FIG. 1. In particular, FIG. 3A shows system 300 before optical transceiver module 314 is inserted. FIG. 3B shows system 300 in cutaway view before optical transceiver module 314 is inserted. FIG. 3C shows system 300 in cutaway view as optical transceiver module 314 is partially inserted. FIG. 3D shows system 300 in cutaway view after optical transceiver module 314 is completely inserted. And FIG. 3E shows system 300 in cutaway view as optical transceiver module 314 is being removed.

In FIG. 3, reference numerals are used that correspond to those used in FIG. 2. (For example, heat-rejecting medium 302 corresponds to heat-rejecting medium 202, etc.)

Figure 3A:
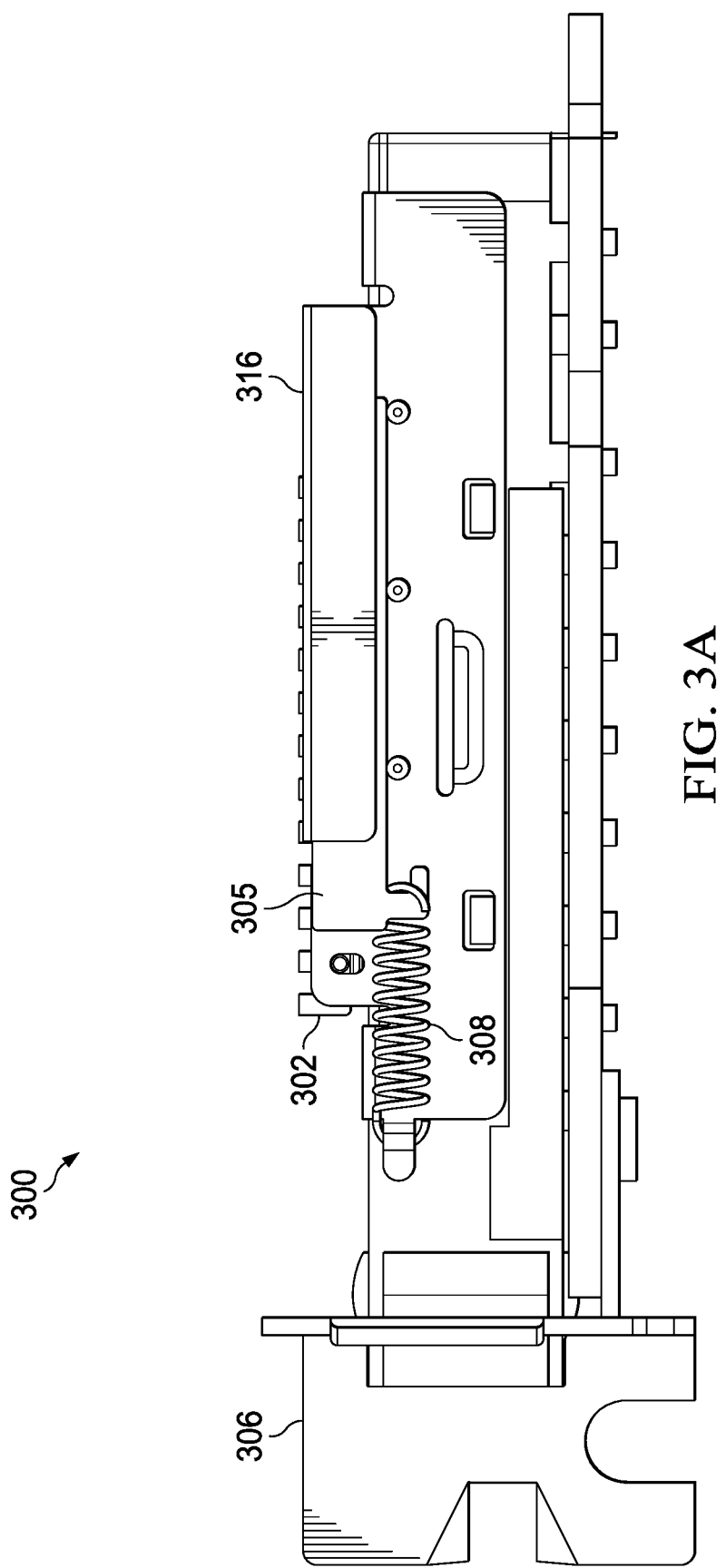
FIGS. 3A-3E illustrate side views of an example optical transceiver module, in accordance with embodiments of the present disclosure.
Figure 3B:
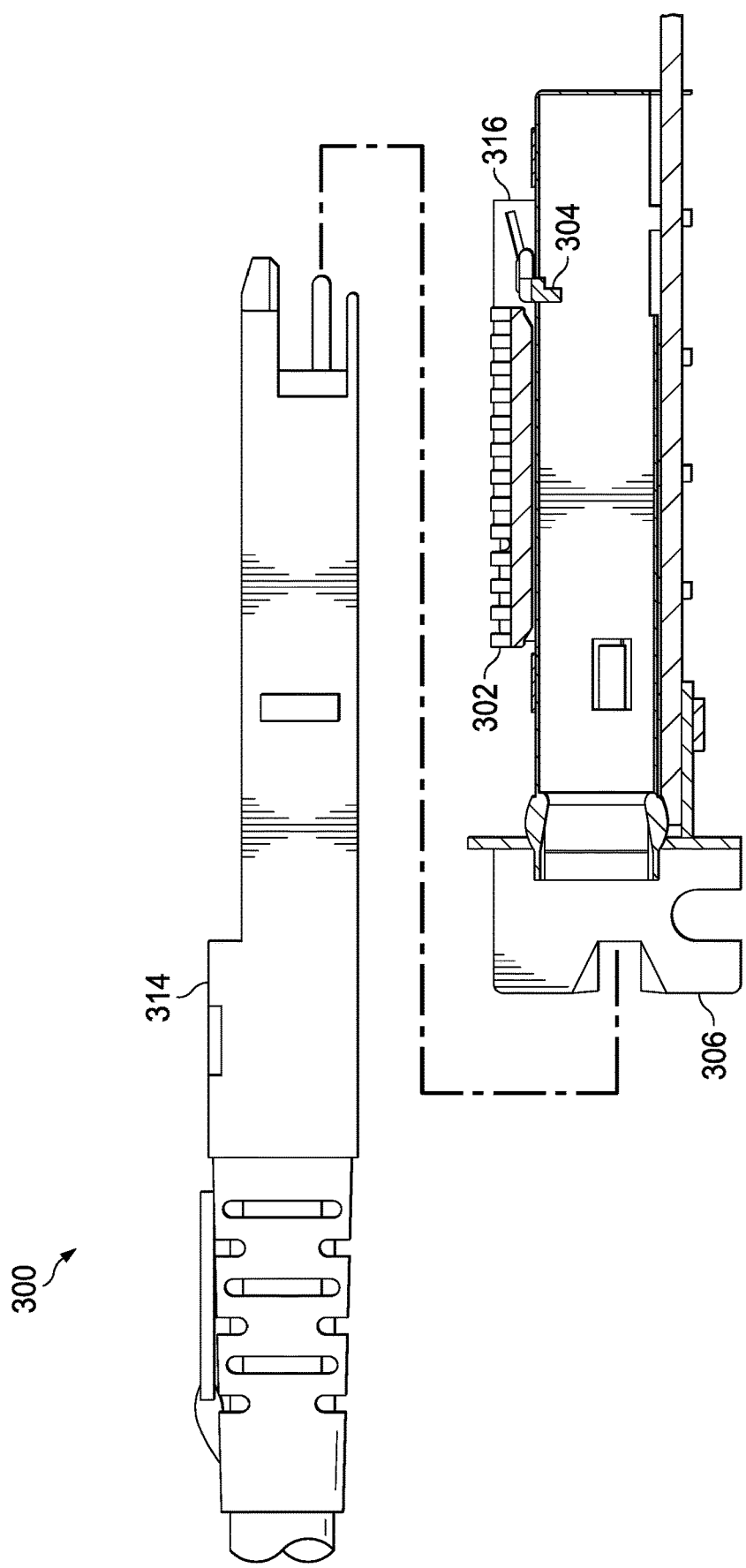
Figure 3C:
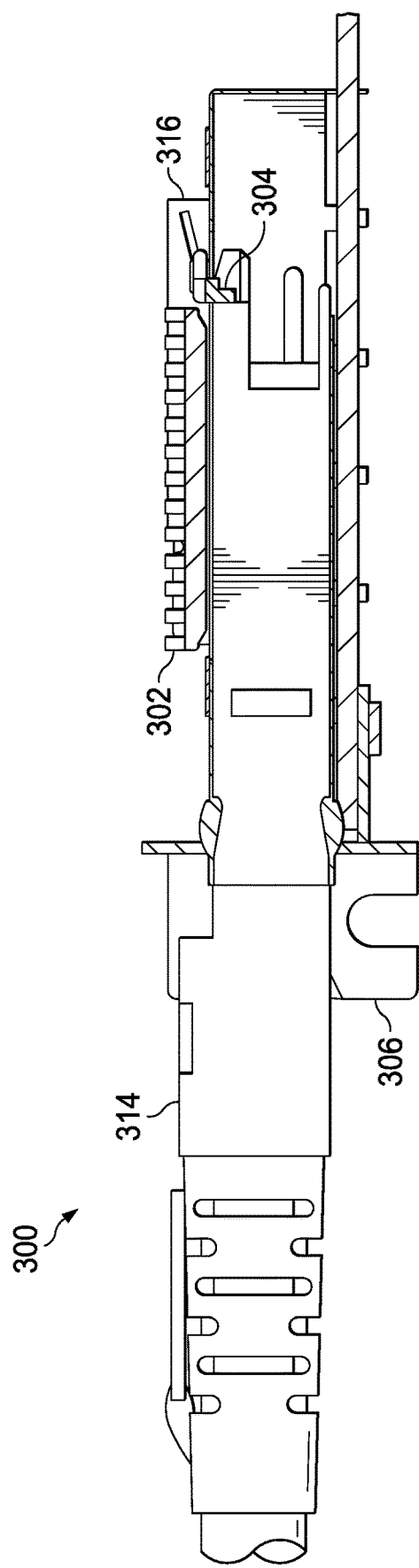
Figure 3D:
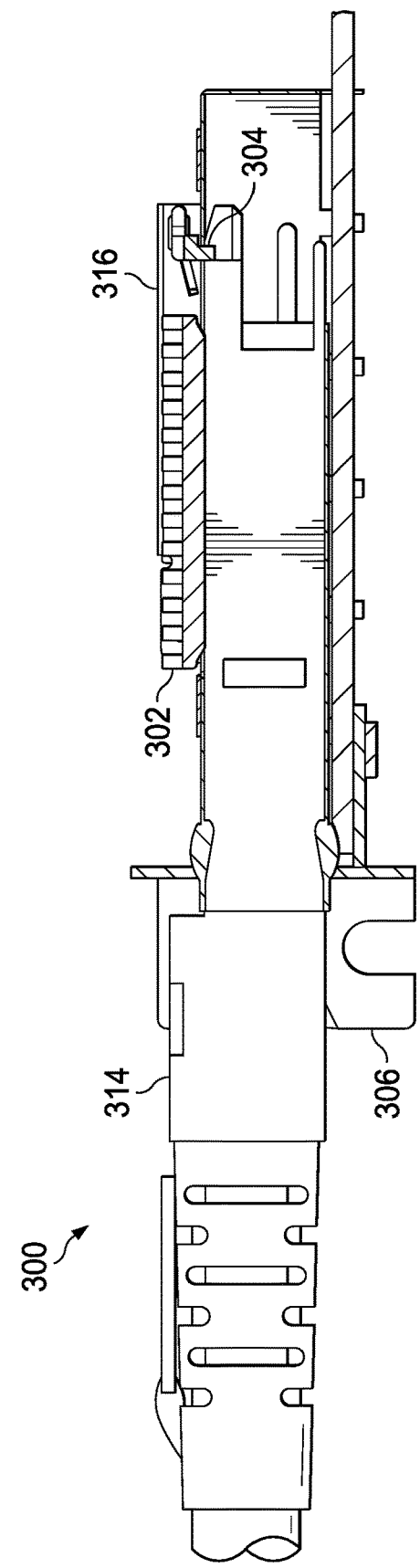

In FIG. 3A, spring 308 provides a biasing force that (via actuators 304 and 305) causes heat-rejecting medium 302 to stay in its upward location. As optical transceiver module 314 is inserted in FIGS. 3B and 3C, actuator 304 begins to move upward and to the right. One or more mechanical linkages may cause this motion to be translated into a rightward motion in actuator 305. This rightward motion of actuator 305 may cause heat-rejecting medium 302 to move downward (e.g., via one or more mechanical linkages as shown in FIG. 2).

Figure 3E:
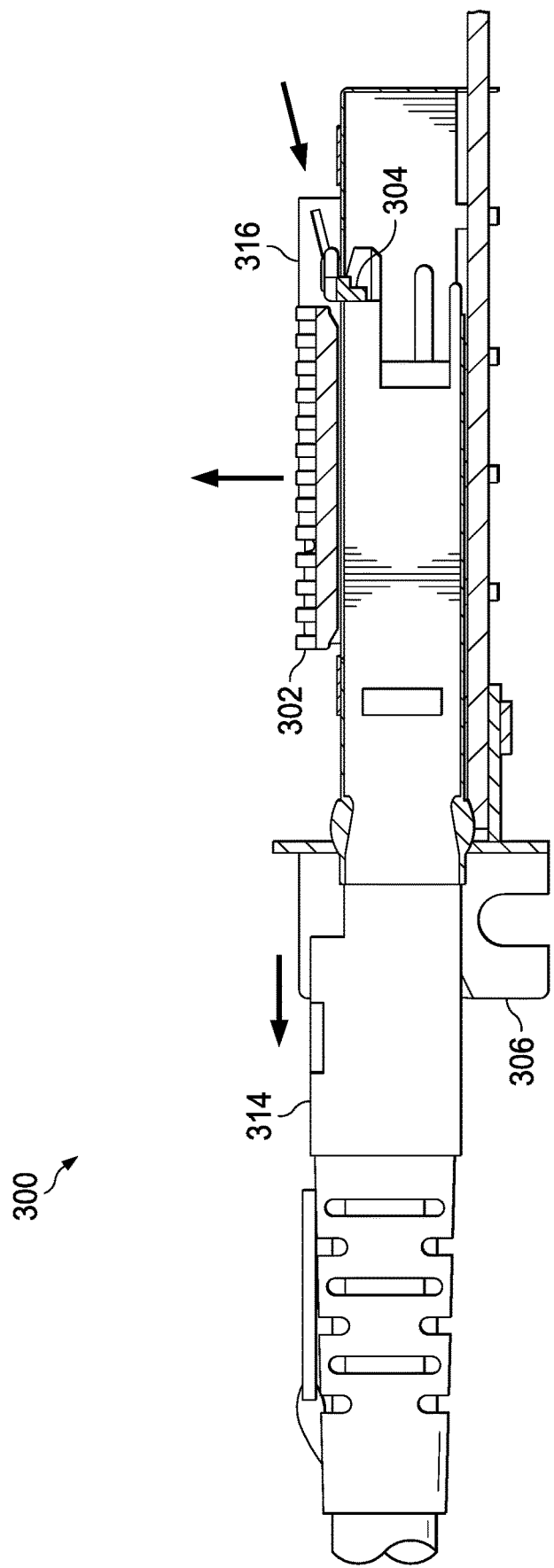

In FIG. 3E, optical transceiver module 314 is being removed from the optical port. Based on the biasing spring force of springs 308, this removal allows actuator 304 to move downward and leftward back to its original position. This also allows actuator 305 to move leftward back to its original position. Finally, this also allows heat-rejecting medium 302 to move upward to its original position, out of the way of optical transceiver module 314 as it is being withdrawn.

For the sake of concreteness, this disclosure generally discusses the use case of optical transceivers. In general, however, one of ordinary skill in the art will understand its applicability to other types of transceivers, as well as pluggable modules generally.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An apparatus comprising:
   an actuator;
   a heat-rejecting medium; and
   a receptacle for receiving a pluggable module, wherein the pluggable module is operable to be inserted into the receptacle in a first direction;
   wherein the actuator is operable to be translated in the first direction by the insertion of the pluggable module into the receptacle;
   wherein the heat-rejecting medium is operable to be translated in a second, different direction by the actuator when the actuator is translated in the first direction; and
   wherein the translation of the heat-rejecting medium in the second direction is operable to cause the heat-rejecting medium to become thermally coupled to the pluggable module when the pluggable module is inserted into the receptacle.

2. The apparatus of claim 1, further comprising a second actuator that is coupled to the actuator via a mechanical linkage, wherein:
   when the pluggable module is inserted into the receptacle, the pluggable module is operable to directly contact the second actuator; and
   when the pluggable module directly contacts the second actuator, the second actuator is operable to cause the actuator to move in the first direction.

3. The apparatus of claim 2, wherein the second direction is perpendicular to the first direction.

4. The apparatus of claim 3, wherein the second actuator is operable to move in a direction different from the first direction and different from the second direction.

5. The apparatus of claim 1, wherein the apparatus includes an aperture through which the heat-rejecting medium passes.

6. The apparatus of claim 1, wherein the pluggable module includes an active device configured to consume electrical power and produce waste heat.

7. The apparatus of claim 6, wherein the pluggable module is an optical transceiver module.

8. The apparatus of claim 1, wherein, when the pluggable module is removed from the receptacle, the heat-rejecting medium is operable to move in a direction opposite the second direction.

9. The apparatus of claim 1, further comprising a thermal interface material operable to thermally couple the heat-rejecting medium to the pluggable module.

10. The apparatus of claim 1, wherein the insertion of the pluggable module into the receptacle is operable to cause the translation of the heat-rejecting medium in the second direction without any additional interaction from a user of the apparatus.

11. A method comprising:
coupling an actuator and a heat-rejecting medium to a receptacle that is operable to receive a pluggable module, wherein the pluggable module is operable to be inserted into the receptacle in a first direction;
wherein the actuator is coupled to the receptacle such that the actuator is operable to be translated in the first direction by the insertion of the pluggable module into the receptacle;
wherein the heat-rejecting medium is coupled to the receptacle such that the heat-rejecting medium is operable to be translated in a second, different direction by the actuator when the actuator is translated in the first direction; and
wherein the translation of the heat-rejecting medium in the second direction is operable to cause the heat-rejecting medium to become thermally coupled to the pluggable module when the pluggable module is inserted into the receptacle.

12. The method of claim 11, further comprising coupling a second actuator to the actuator via a mechanical linkage such that:
when the pluggable module is inserted into the receptacle, the pluggable module is operable to directly contact the second actuator; and
when the pluggable module directly contacts the second actuator, the second actuator is operable to cause the actuator to move in the first direction.

13. The method of claim 12, wherein the second direction is perpendicular to the first direction.

14. The method of claim 13, wherein the second actuator is operable to move in a direction different from the first direction and different from the second direction.

15. The method of claim 11, further comprising forming an aperture in the receptacle through which the heat-rejecting medium passes.

16. The method of claim 11, wherein the pluggable module includes an active device configured to consume electrical power and produce waste heat.

17. The method of claim 16, wherein the pluggable module is an optical transceiver module.

18. The method of claim 11, wherein the actuator and the heat-rejecting medium are coupled to the receptacle such that when the pluggable module is removed from the receptacle, the heat-rejecting medium is operable to move in a direction opposite the second direction.

19. The method of claim 11, further comprising disposing a thermal interface material on the heat-rejecting medium such that the thermal interface material is operable to thermally couple the heat-rejecting medium to the pluggable module.

20. The method of claim 11, wherein the insertion of the pluggable module into the receptacle is operable to cause the translation of the heat-rejecting medium in the second direction without any additional interaction from a user of the apparatus.

* * * * *